(12) United States Patent
Lin

(10) Patent No.: US 9,651,717 B2
(45) Date of Patent: May 16, 2017

(54) OPTICAL LENS

(71) Applicant: HON HAI PRECISION INDUSTRY CO., LTD., New Taipei (TW)

(72) Inventor: Po-Yu Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 43 days.

(21) Appl. No.: 14/861,482

(22) Filed: Sep. 22, 2015

(65) Prior Publication Data
US 2016/0327239 A1 Nov. 10, 2016

(30) Foreign Application Priority Data
May 4, 2015 (TW) .............................. 104114167 A

(51) Int. Cl.
*F21V 5/04* (2006.01)
*G02B 3/00* (2006.01)
*F21Y 115/10* (2016.01)

(52) U.S. Cl.
CPC .................. *G02B 3/00* (2013.01); *F21V 5/04* (2013.01); *F21Y 2115/10* (2016.08)

(58) Field of Classification Search
CPC ... G02B 3/00; F21V 5/04; F21V 5/046; F21V 5/002; F21Y 2115/10
USPC .............. 362/335, 336, 337, 311.01, 311.06, 362/311.09, 311.07, 311.08, 455, 434, 362/441; 257/98, 100
See application file for complete search history.

(56) References Cited

U.S. PATENT DOCUMENTS

| | | | | |
|---|---|---|---|---|
| 2013/0161671 A1* | 6/2013 | Hsu | .......................... | H01L 33/58 257/98 |
| 2014/0169031 A1* | 6/2014 | Lin | ........................... | F21V 5/04 362/606 |
| 2014/0177235 A1* | 6/2014 | Lin | ........................... | F21V 5/04 362/311.02 |
| 2015/0078011 A1* | 3/2015 | Sy | .......................... | F21V 13/04 362/327 |
| 2016/0102816 A1* | 4/2016 | Li | ............................ | F21V 5/04 362/97.1 |
| 2016/0102838 A1* | 4/2016 | Li | .......................... | H01L 33/58 362/311.02 |

* cited by examiner

*Primary Examiner* — Andrew Coughlin
*Assistant Examiner* — Glenn Zimmerman
(74) *Attorney, Agent, or Firm* — Steven Reiss

(57) ABSTRACT

An optical lens includes a central optical portion and a mounting portion around the central optical portion. The central optical portion has a bottom and defines a central cavity recessed upwardly from the bottom. The central cavity is provided for receiving a light source therein. The bottom defines at least a frosted portion around the central cavity and at least a microstructure portion around the at least a frosted portion. A roughness of the at least a microstructure portion is larger than a roughness of the at least a frosted portion. The roughness of each of the at least a microstructure and frosted portion is gradually decreased alone a direction toward the central cavity.

11 Claims, 14 Drawing Sheets

OPTICAL LENS

CROSS-REFERENCE TO RELATED APPLICATION

This application claims priority to Taiwanese Patent Application No. 104114167 filed on May 4, 2015 in the Taiwan Intellectual Property Office, the contents of which are entirely incorporated by reference herein.

FIELD

The subject matter herein generally relates to an optical lens, and particularly to an optical lens for use with a lamp to increase an illumination angle of the lamp.

BACKGROUND

In a backlight module or other illumination devices, to increase the illumination angle of a light source thereof, an optical lens is provided in front of the light source. Light through the optical lens is partly reflected, whereby the utilization of the light is low. To increase the light utilization by decreasing the light reflection, a micro structure is formed on a side of the optical lens facing the light source. Such micro structure though can enhance the light utilization, it can reduce the evenness of the light or even increase the chromatic aberration.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present optical lens. Moreover, in the drawings, like reference numerals designate corresponding parts throughout the several views.

DETAILED DESCRIPTION

Figure 1:
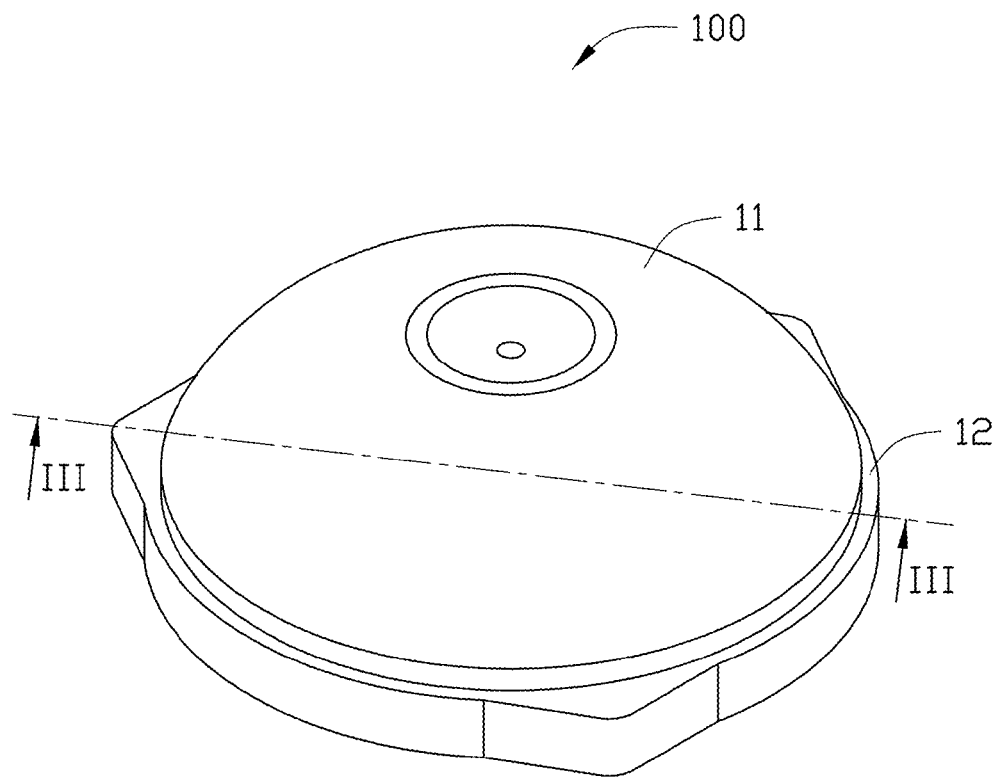
FIG. 1 is an isometric view of an optical lens in accordance with a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Referring to FIG. 1, an optical lens 100 in accordance a first embodiment of the present disclosure is shown. The optical lens 100 can be used as a secondary optical system for a light source such as a light emitting diode (LED) to enlarge an illumination angle of light generated by the LED. The optical lens 100 has a substantially semispherical structure. The optical lens 100 includes an optical portion 11 for modulating light passing through the optical lens 100, and a mounting portion 12 for mounting the optical lens 100 to a mounting structure such as a substrate. The mounting portion 12 is formed at a periphery of the optical portion 11. The optical portion 11 and the mounting portion 12 can be integrally formed as a monolithic piece. The optical lens 100 can be made of glass or plastic.

Figure 2:
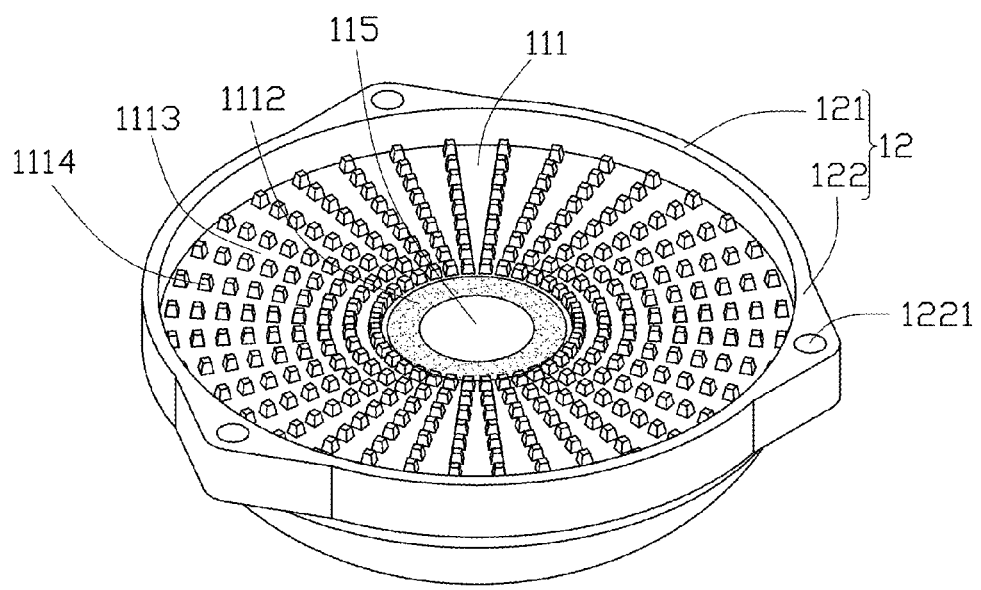
FIG. 2 is a view similar to FIG. 1, viewed from a different angle.

Referring to FIG. 2, the optical lens 100 has a recessed bottom 111 which defines a central cavity 115 in a center thereof. The cavity 115 is provided for receiving a light source such as an LED therein when the optical lens 100 and the light source are assembled together. A substantially annular frosted portion 1112 is formed on the recessed bottom 111 and around the cavity 115. A roughness of the frosted portion 1112 is gradually decreased along a direction toward the cavity 115. The recessed bottom 111 further forms a substantially annular microstructure portion 1113 thereon and around the annular frosted portion 1112. The microstructure portion 1113 includes a plurality of protrusions 1114. Each protrusion 1114 has a configuration of a frusto-pyramid. A roughness of the microstructure portion 1113 is gradually decreased along a direction toward the cavity 115. An average roughness of the microstructure portion 1113 is larger than an average roughness of the frosted portion 1112. Moreover, a minimum roughness of the microstructure portion 1113 is larger than a maximum roughness of the frosted portion 1112. The mounting portion 12 includes an annular peripheral wall 121 around the recessed bottom 111 and three bulges 122 protruding radically outwardly from the annular peripheral wall 121. The three bulges 122 are equidistantly spaced from each other. Each bulge 122 defines a mounting hole 1221 therein. Each mounting hole 1221 is a blind hole.

Figure 3:
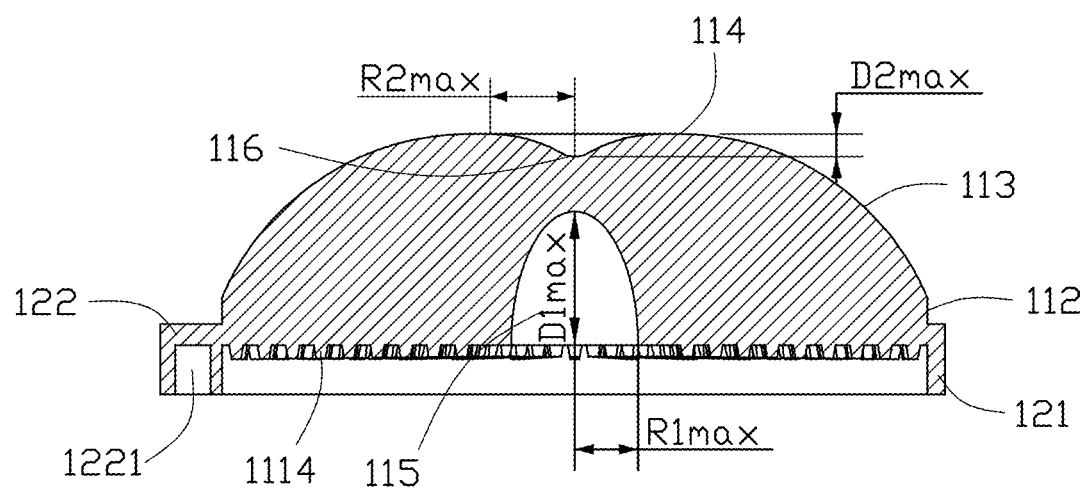
FIG. 3 is a cross-sectional view of the optical lens of FIG. 1, taken along line thereof.

Referring to FIG. 3, the optical portion 11 of the optical lens 100 includes a first lateral side 112, a second lateral side 113 and a top side 114. The first lateral side 112 is vertical and perpendicularly connects with the annular peripheral wall 121. The second lateral side 113 is arced and interconnects the first lateral side 112 and the top side 114. The second lateral side 113 extends from the top side 114 outwardly and downwardly to connect with the first lateral side 112. The top side 114 defines a depression 116 in a center thereof which has a shape substantially similar to an inverted cone with a bottom tip coincidental with a center of the optical lens 100 and a center of the cavity 115. A radius R2 of the depression 116 is gradually decreased along a downward direction, whereby the depression 116 has a maximum radius R2max in a top thereof. The depression 116 has a maximum depth D2max along the center of the optical lens 100, wherein the maximum depth D2max is smaller than the maximum radius R2max. The central cavity 115 has a shape of a semi-ellipse, having a maximum depth D1max along the center of the optical lens 100, and a maximum radius R1max at the bottom of the optical lens 100, wherein R1max is equal to or smaller than R2max and D1max is larger than D2max.

Figure 4:
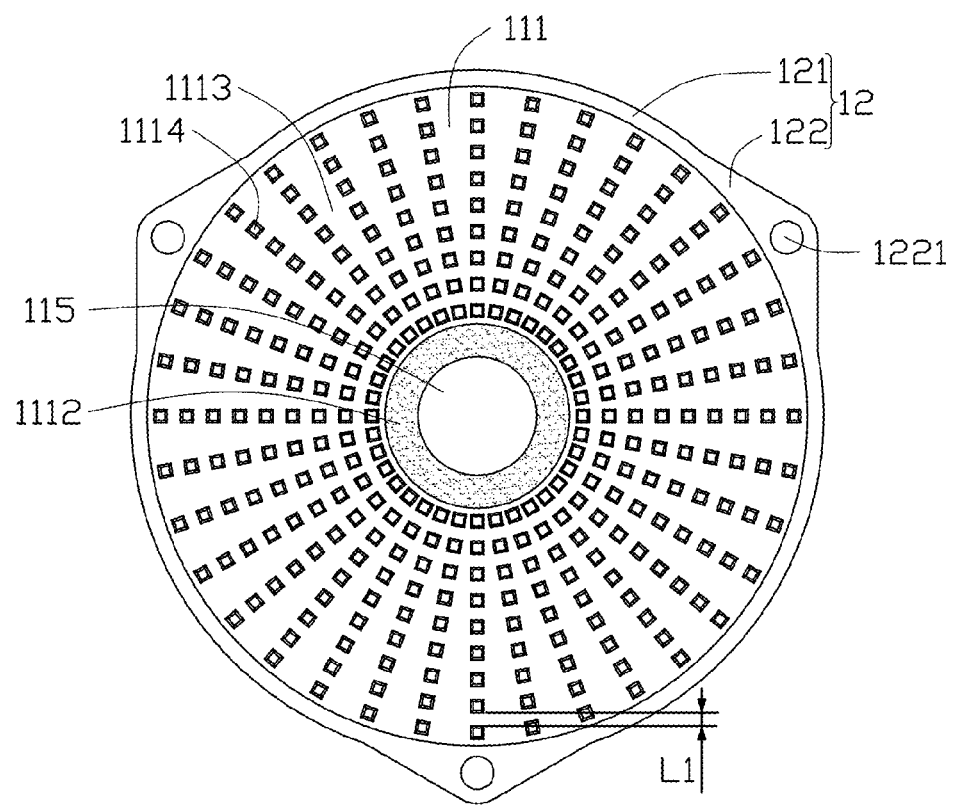
FIG. 4 is a diagrammatic view of a bottom of the optical lens of FIG. 1.

Referring to FIG. 4, the protrusions 1114 are arranged in a circular matrix consisting of a plurality of circles. A space between each two adjacent protrusions 1114 in a corresponding circle is the same as each other. An amount of the protrusions 1114 in each circle is the same as each other. A space L1 between each two adjacent circles of the protrusions 1114 is gradually increased along a direction away from the central cavity 115.

Figure 5:
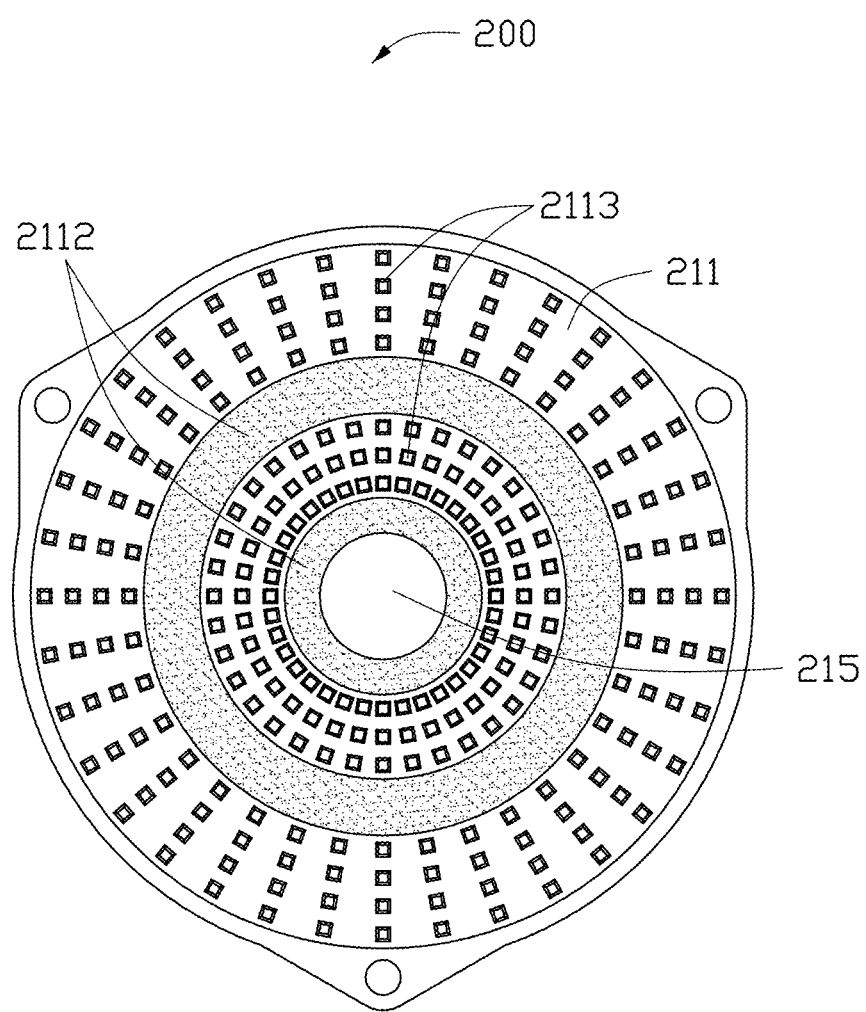
FIG. 5 is a diagrammatic view of a bottom of an optical lens in accordance with a second embodiment of the present disclosure.

Referring to FIG. 5, an optical lens 200 in accordance with a second embodiment is shown, which is substantially the same as the optical lens 100 of the first embodiment. The difference is that in the second embodiment the recessed bottom 211 of the optical lens 200 has a plurality of frosted portions 2112 and a plurality of microstructure portions 2113. The frosted portions 2112 and the microstructure portions 2113 each have a shape of a circle around the central cavity 215. The frosted portions 2112 and the microstructure portions 2113 are alternated along a radial direction away from the central cavity 215, wherein it is one of the frosted portions 2112 which is immediately adjacent to the central cavity 215. A roughness of each frosted portion 2112 is gradually decreased along a direction toward the central cavity 215. An average roughness of an inner frosted portion 2112 is smaller than an average roughness of an outer frosted portion 2112. A roughness of each microstructure portion 2113 is gradually decreased along the direction toward the central cavity 215. An average roughness of an inner microstructure portion 2113 is smaller than an average roughness of an outer microstructure portion 2113. The average roughness of each microstructure portion 2113 is larger than the average roughness of each frosted portion 2112.

Figure 6:
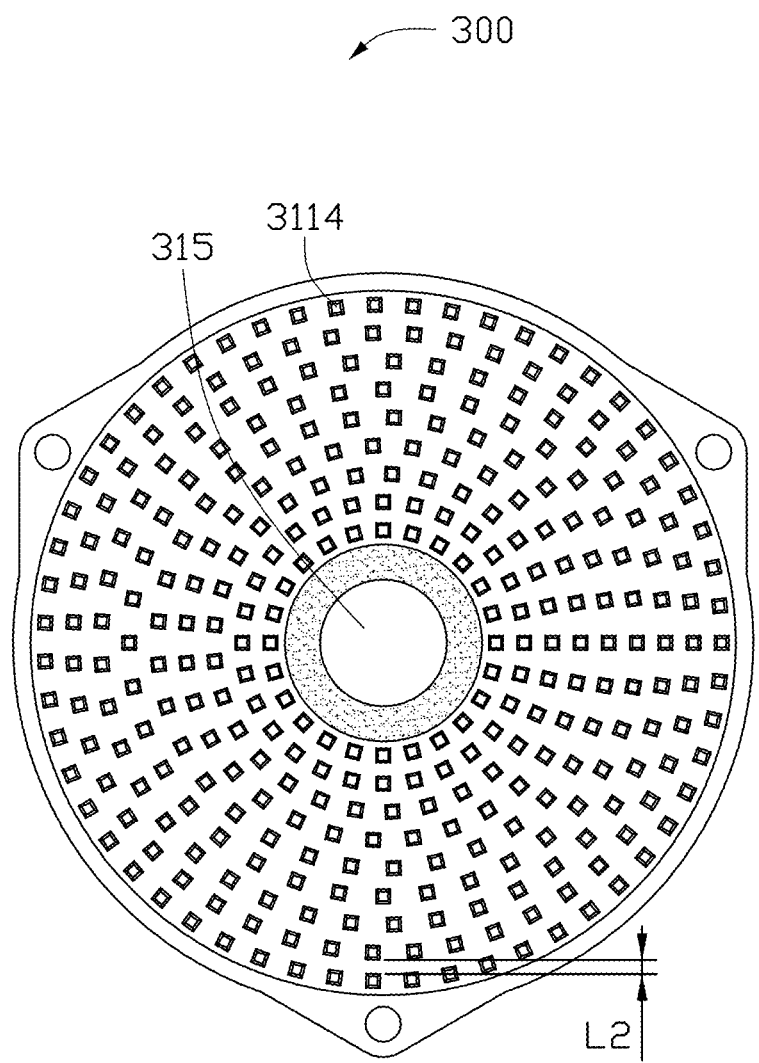
FIG. 6 is a diagrammatic view of a bottom of an optical lens in accordance with a third embodiment of the present disclosure.

Referring to FIG. 6, an optical lens 300 in accordance with a third embodiment is shown, which is substantially the same as the optical lens 100 of the first embodiment. The difference is that in the second embodiment the optical lens 300 has a different arrangement regarding the protrusions 3114 of the microstructure portion. The protrusions 3114 are arranged in a plurality of circles around the central cavity 315. A space between each two adjacent protrusions 3114 in a same circle is the same as each other. An amount of the protrusions 3114 in each circle is gradually increased along a direction away from the central cavity 315. A space L2 between each two adjacent circles of the protrusions 3114 is the same as each other.

Figure 7:
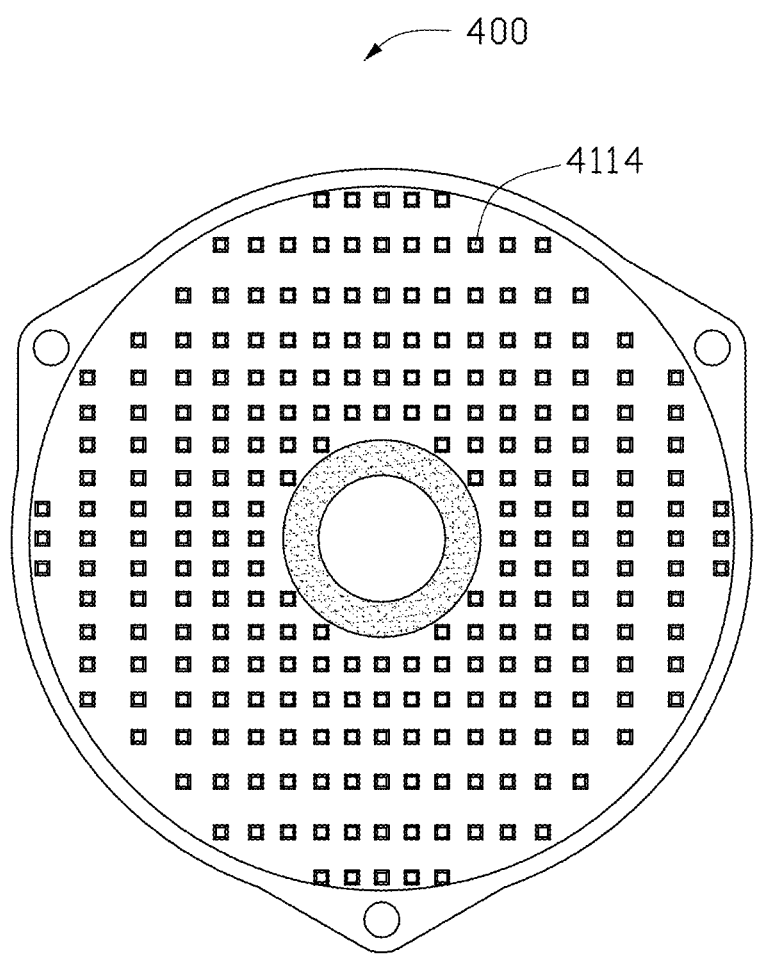
FIG. 7 is a diagrammatic view of a bottom of an optical lens in accordance with a fourth embodiment of the present disclosure.

Referring to FIG. 7, an optical lens 400 in accordance with a fourth embodiment is shown, which is substantially the same as the optical lens 100 of the first embodiment. The difference is that in the fourth embodiment the optical lens 400 has a different arrangement regarding the protrusions 4114. The protrusions 4114 of the optical lens 400 are arranged into a plurality of rectangular rings each having four corners. A density of the protrusions 4114 of a respective ring around each of the four corners is less than that in other portions of the respective ring. In other words, for each line of the respective ring, a space between each two adjacent protrusions 4114 is gradually increased along each of two directions from a center of the line toward two opposite ends of the line.

Figure 8:
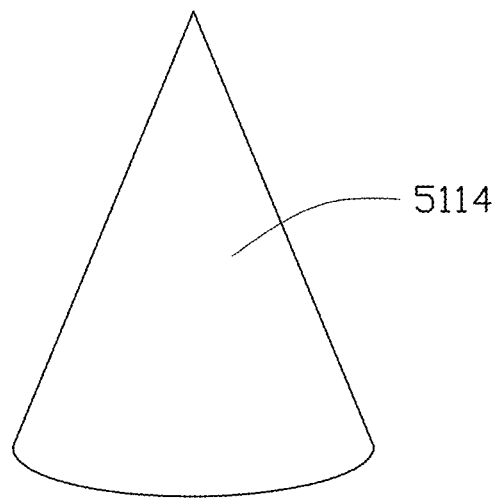
FIG. 8 is an enlarged perspective view of a protrusion of a microstructure portion of an optical lens in accordance with a fifth embodiment of the present disclosure.

Referring to FIG. 8, a different configuration of the protrusion is shown, wherein the protrusion 5114 can be a circular cone. It can be understood that the protrusion 5114 can also be a triangular cone or a rectangular cone, i.e., a pyramid.

Figure 9:
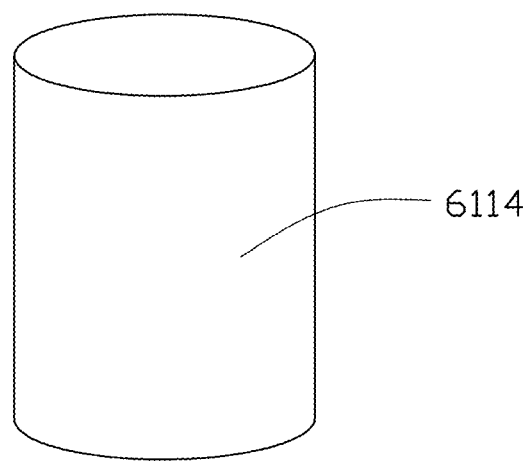
FIG. 9 is a view similar to FIG. 8, showing a protrusion of a microstructure portion of an optical lens in accordance with a sixth embodiment of the present disclosure.

Referring to FIG. 9, a different configuration of the protrusion is shown, wherein the protrusion 6114 can be a cylinder. It can be understood that the protrusion 6114 can also be a prism such as a rectangular prism.

Figure 10:
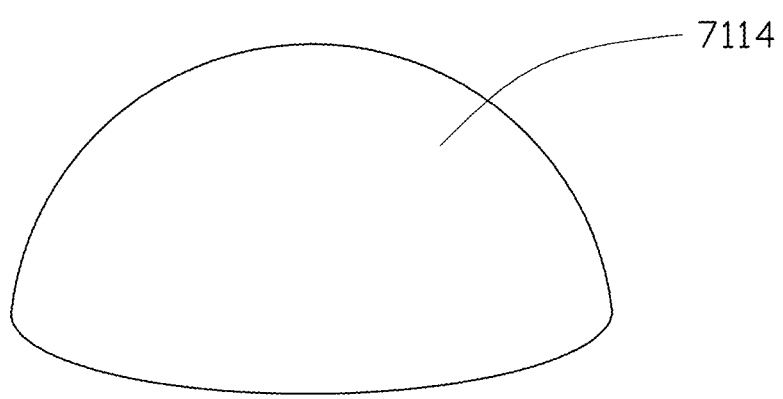
FIG. 10 is a view similar to FIG. 8, showing a protrusion of a microstructure of an optical lens in accordance with a ninth embodiment of the present disclosure.

Referring to FIG. 10, a different configuration of the protrusion is shown, wherein the protrusion 7114 can be a hemisphere.

Figure 11:
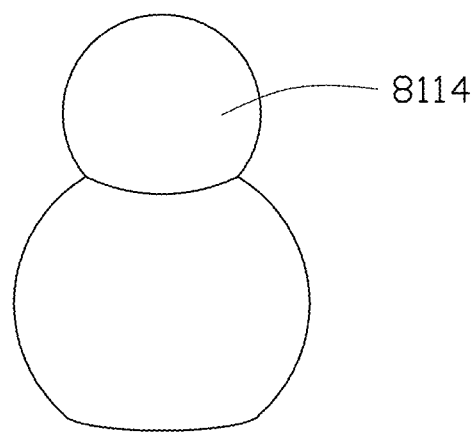
FIG. 11 is a view similar to FIG. 8, showing a protrusion of a microstructure of an optical lens in accordance with a tenth embodiment of the present disclosure.

Referring to FIG. 11, a different configuration of the protrusion is shown, wherein the protrusion 8114 can have a shape substantially like a gourd.

Figure 12:
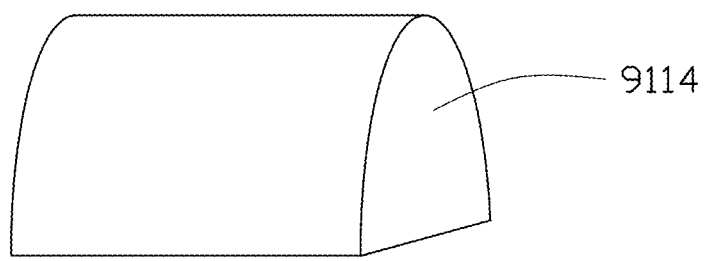
FIG. 12 is a view similar to FIG. 8, showing a protrusion of a microstructure of an optical lens in accordance with an eleventh embodiment of the present disclosure.

Referring to FIG. 12, a different configuration of the protrusion is shown, wherein the protrusion 9114 has a shape of semi-cylinder which is horizontally oriented.

In a further alternative embodiment of the present disclosure, referring back to FIG. 3, at most two of the first side 112, second side 113 and top side 114 can be formed as frosted sides. Specifically, the first and second sides 112, 113 each are formed as a frosted side whose roughness is gradually increased along a direction from the recessed bottom 111 toward the top side 114.

Figure 13:
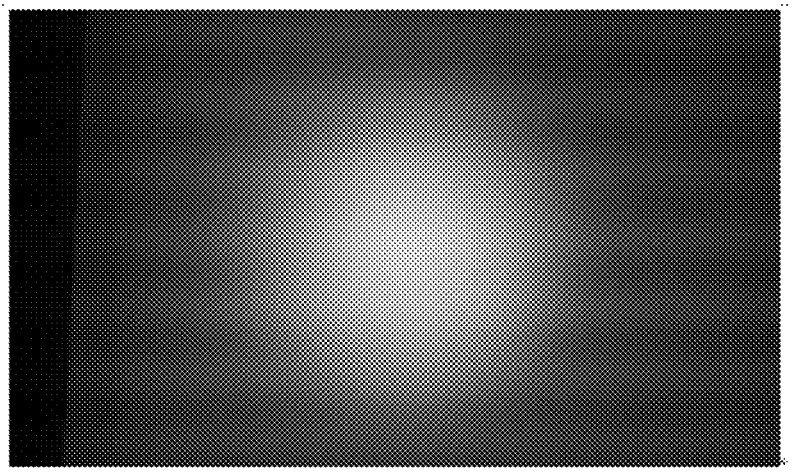
FIG. 13 is a photo of illumination of light after passing through the optical lens in accordance the present disclosure.
Figure 14:
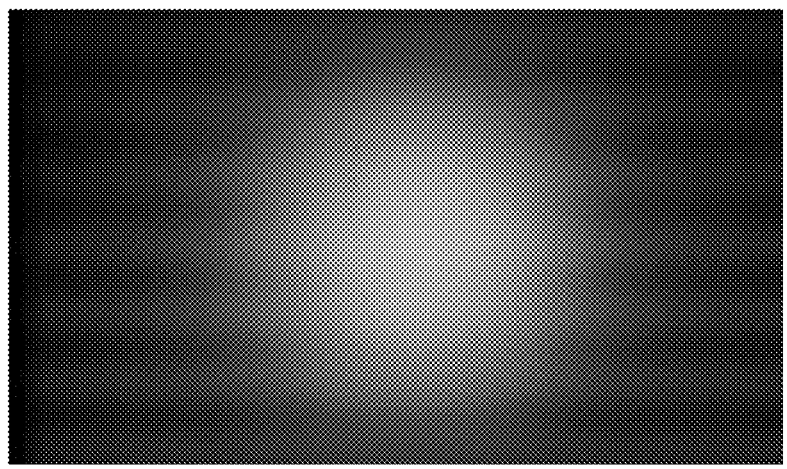
FIG. 14 is a photo of illumination of light after passing through the optical lens in accordance with prior art.

Referring to FIGS. 13 and 14, images of light through the optical lens in accordance with the present disclosure and prior art are obtained. It can be seen that an illumination obtained by having light passing through the optical lens in accordance with the present disclosure can have improved evenness and lessened chromatic aberration, in comparison with an illumination obtained by having light passing through the optical lens in accordance with prior art.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. An optical lens comprising:
    a central optical portion having a bottom and defining a central cavity recessed upwardly from the bottom, the central cavity being configured for receiving a light source therein, the bottom defining a frosted portion around the central cavity and a microstructure portion around the frosted portion; and
    a mounting portion around the central optical portion, configured for mounting the optical lens to a mounting structure;
    wherein a roughness of the microstructure portion is larger than a roughness of the frosted portion.

2. The optical lens of claim 1, wherein the roughness of the frosted portion is gradually decreased along a direction toward the central cavity, and the roughness of the microstructure portion is gradually decreased along the direction toward the central cavity.

3. The optical lens of claim 2, wherein the microstructure portion includes a plurality of protrusions arranged in a plurality of coaxial circles around the central cavity.

4. The optical lens of claim 2, wherein the microstructure portion includes a plurality of protrusions arranged in a plurality of rectangular rings around the central cavity, each rectangular ring includes four sides, and the protrusions in each side have a density which is gradually decreased from a center of each side toward two opposite ends of each side.

5. The optical lens of claim 3, wherein a space between each two adjacent protrusions in a corresponding circle is the same as each other, an amount of the protrusions in each circle is the same as each other, and a space between each two adjacent circles is gradually increased along a direction away from the central cavity.

6. The optical lens of claim 3, wherein a space between each two adjacent protrusions in a corresponding circle is the same as each other, an amount of the protrusions in each circle is gradually increased along a direction away from the central cavity, and a space between each two adjacent circles of the protrusions is the same as each other.

7. The optical lens of claim 5, wherein the central optical portion defines a first side connecting with the mounting portion, a top side defining a central depression recessed downwardly toward the central cavity and an arced second side extending outwardly and downwardly from the top side to connect with the first side, the central cavity having a substantially semi-ellipse shape with a maximum radius R1max at a bottom thereof and a maximum depth D1max at a center thereof, the central depression having a substantially inverted cone shape with a maximum radius R2max at a top thereof and a maximum depth D2max at a center thereof, wherein D2max is smaller than R2max, R1max is no larger than R2max and D1max is larger than D2max.

8. The optical lens of claim 7, wherein the protrusions each have a configuration selected from a group consisting of a frusto-pyramid, a cone, a cylinder, a hemisphere, a gourd, and a horizontally oriented semi-cylinder.

9. The optical lens of claim 8, wherein the bottom of the central optical portion defines a plurality of frosted portions and a plurality of microstructure portions, the plurality of frosted portions and the plurality of microstructures portions are alternated with each other, and one of the frosted portion is located immediately adjacent to the central cavity.

10. The optical lens of claim 9, wherein a roughness of each of the frosted portions and microstructure portions is decreased along a direction toward the central cavity, an average roughness of an inner frosted portion is smaller than an average roughness of an outer frosted portion, an average roughness of an inner microstructure portion is smaller than an average roughness of an outer microstructure portion, the average roughness of each microstructure portion is larger than the average roughness of each microstructure portion.

11. An optical lens configured for dispersing light from a light source, comprising:
    an optical portion; and
    a mounting portion around the optical portion, configured for mounting the optical lens to a mounting structure;
    the optical portion having a recessed bottom defining a cavity in a center thereof which is configured for receiving the light source therein, at least a frosted portion around cavity and at least a microstructure portion around the at least a frosted portion, the at least a microstructure portion having a roughness larger than a roughness of the at least a frosted portion, the roughness of each of the at least a microstructure portion and the at least a frosted portion being gradually decreased along a direction toward the cavity; and
    the optical portion further having a top side defining a substantially inverted-cone shaped depression recessed downwardly toward the cavity, a depth of the depression at a center thereof being smaller than a radius of the depression at a top thereof.

* * * * *